United States Patent
Mirfakhraei (10) Patent No.: US 6,512,789 B1
(45) Date of Patent: Jan. 28, 2003

(54) PARTIAL EQUALIZATION FOR DIGITAL COMMUNICATION SYSTEMS

(75) Inventor: Khashayar Mirfakhraei, Fremont, CA (US)

(73) Assignee: PCTel, Inc., Milpitas, CA (US)

( * ) Notice: Subject to any disclaimer, the term of this patent is extended or adjusted under 35 U.S.C. 154(b) by 0 days.

(21) Appl. No.: 09/304,015

(22) Filed: Apr. 30, 1999

(51) Int. Cl.[7] .............................. H03H 7/30; H03H 7/40; H03H 5/159
(52) U.S. Cl. ........................................ 375/229; 708/323
(58) Field of Search ................................. 375/229, 230, 375/232, 219, 224, 285, 346, 350, 231; 708/323, 300; 333/18, 28 R (56) References Cited

U.S. PATENT DOCUMENTS 4,494,214 A * 1/1985 Bernard et al. ............. 333/166
5,404,322 A * 4/1995 Gehring ..................... 708/300

* cited by examiner

*Primary Examiner*—Jean Corrielus
(74) *Attorney, Agent, or Firm*—Skjerven Morrill LLP (57) ABSTRACT

A training process for a filter such as included in a time domain equalizer for an xDSL transceiver includes a novel spectral estimation process for a channel. The spectral estimation determines the taps of the filter using an over-determined set of equations based on the auto-correlation estimates of the received signal. A weighting function such as a sigmoidal function is applied to the AC coefficients to change the relative weighting of the AC coefficients. Upon solving for the taps of the filter using a fitting criterion such as the least square error criterion, the filter significantly reduces the impulse response of the channel.

19 Claims, 5 Drawing Sheets

PARTIAL EQUALIZATION FOR DIGITAL COMMUNICATION SYSTEMS

BACKGROUND

1. Field of the Invention

This invention relates to communication systems, transceivers, and modems and to processing of digital communication signals.

2. Description of Related Art

Emerging standards for digital communications widely use multi-carrier modulation, such as Discrete Multi-Tone (DMT) modulation, to provide high data transmission rates. Such standards include "high bit rate digital subscriber loop" (HDSL), "very fast asymmetric digital subscriber loop" (VDSL), "asymmetric digital subscriber loop" (ADSL) which is ITU, ANSI, and ETSI standard G.992.1 (or G.dmt), and light rate ADSL which is an ITU standard G.992.2 (or G.lite). Transceivers or modems that implement any of these or similar standards are sometime referred to herein as xDSL transceivers. The data communication protocols for xDSL transceivers are specified for copper wire (telephone lines) as the transportation medium between regional central offices (CO) and homes. These long copper wires cause non-uniform distortion across the spectrum of broadband communication signals. Accordingly, quadrature amplitude modulation (QAM) as used in V.32 and V.34 modem standards or pulse amplitude modulation (PAM) as used in V.90 and ISDN are not suitable modulation techniques for broadband signals on long copper wires. Instead, xDSL transceivers use DMT modulation and break a broad bandwidth channel into multiple sub-channels. With a large number of sub-channels, xDSL transceivers deliver high bit rates, when compared to ISDN or voice band modems.

Typically, each sub-channel has a bandwidth of about 4 kHz, and the G.992.1 and G.992.2 standards implement 256 and 128 sub-channels respectively. QAM independently modulates data for transmission in each sub-channel rather than modulating the full bandwidth as a whole. An advantage of DMT modulation is that the attenuation and distortion within each sub-channel are fairly constant, hence, a receiver can independently equalize each sub-channel. Moreover, one can estimate each sub-channel's transport capacity and assign an appropriate load to each sub-channel by selecting the number of modulated bits 'b' and the transmit power, 'g' for that sub-channel. The appropriate choices of bit loading and transmit power per channel enable a DMT system to efficiently utilize the channel's capacity and reduce the receiver's burden of distortion mitigation.

After loading of the N sub-channels, an inverse discrete Fourier transform (IDFT) bundles the sub-channels into a time domain signal, called a DMT symbol that a series of digital samples can represent. A redundant guard signal or cyclic extension of a fix length can be appended to each DMT symbol to help the receiver reduce intersymbol interference (ISI) between DMT symbols. To transmit the signal through the copper wire, a Digital-to-Analog Converter (DAC) converts the digital samples to an analog signal, and an amplifier (or line driver) boosts the power of the analog signal transmitted.

The receiver samples a received waveform and passes the digitized samples through a time domain equalizer (TEQ), typically an FIR filter. The TEQ reduces the channel's impulse response and at least partially corrects for distortion across the broadband channel. The main channel induced distortion in the received signal is typically due to the long impulse response of the channel. Generally, the channel's impulse response stretches over several samples (e.g., if an impulse signal is input to the channel, the output signal from the channel takes more than one sample period to settle to zero). Inter-symbol interference (ISI) occurs when the residue from the preceding DMT symbol overlaps the following DMT symbol. ISI can corrupt a received DMT symbol. Typically, the TEQ attempts to reduce the impulse response time as much as possible. With a guard signal, the TEQ has adequately reduced the impulse response time to prevent ISI between DMT symbols when the impulse response time in the output signal from the TEQ is less than the period of the guard signal. Hence, at the output from the TEQ, only the guard signal is ISI distorted and not the following DMT symbol. The receiver can discard the guard signal and use a discrete Fourier transform (DFT) to decompose the time domain DMT symbol into independent constituents (sub-channels).

A frequency domain equalizer (FEQ) and slicing (or quantization) extract the separate content (i.e., a QAM symbol) of each sub-channel. Thereafter, the N QAM symbols are decoded into their corresponding bits, and a parallel to serial converter assembles the bits to provide the information that was transmitted.

To optimize xDSL transceiver performance, efficient methods for equalizing received signals to remove intersymbol interference and channel distortion are sought.

SUMMARY

In accordance with an embodiment of the invention, a training process for a filter such as a time domain equalizer of an xDSL transceiver uses a novel method for spectral estimation of a channel. The spectral estimation determines the taps of the filter using an overdetermined set of equations based on the auto-correlation estimates of the received signal. A weighting function such as a sigmoidal function is applied to the AC coefficients, before use in the overdetermined equations, to change the relative weighting of the AC coefficients. Upon solving the equations for the taps of the filter using a fitting criterion such as the least square error criterion, the filter significantly reduces the impulse response of the channel.

In accordance with another embodiment of the invention, a receiver samples and averages values of a signal over a channel. The received signal corresponds to repeated copies of a known signal. The receiver then determines an auto-correlation sequence from the averaged sample values and corresponding values of the known signal and applies a weighting function to coefficients from the auto-correlation (AC) sequence. The weighting function can be a sigmoidal function of the correlation length or another function that provides weighting values for multiplication by corresponding AC coefficients. Applying the sigmoidal weighting function reduces the magnitudes of weighted AC coefficients at large correlation lengths relative to the weighted AC coefficients at short lengths. Solving an overdetermined system of equations containing the weighted AC coefficients identifies the taps of a digital filter for reducing the impulse response of the channel. A time-domain equalizer for a xDSL transceiver can use the digital filter to reduce impulse response and distortion from a broadband communication channel.

Another embodiment of the invention is a communication system that trains a time domain equalizer using the training processes.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an embodiment of the invention, a training method for a time domain equalizer includes transmitting multiple copies of a preselected pseudo-random series to a receiver, averaging the multiple copies at the receiver to cancel noise in the averaged received values for the pseudo-random series, and determining taps of a time domain equalizer (TEQ) using a spectral estimation for the channel. The spectral estimation determines the taps using an overdetermined set of equations based on the autocorrelation (AC) estimates of the received signal. Applying a weighting function to the AC coefficients gives more importance to some auto correlation coefficients or delay values in solving the over determined equation.

Figure 1:
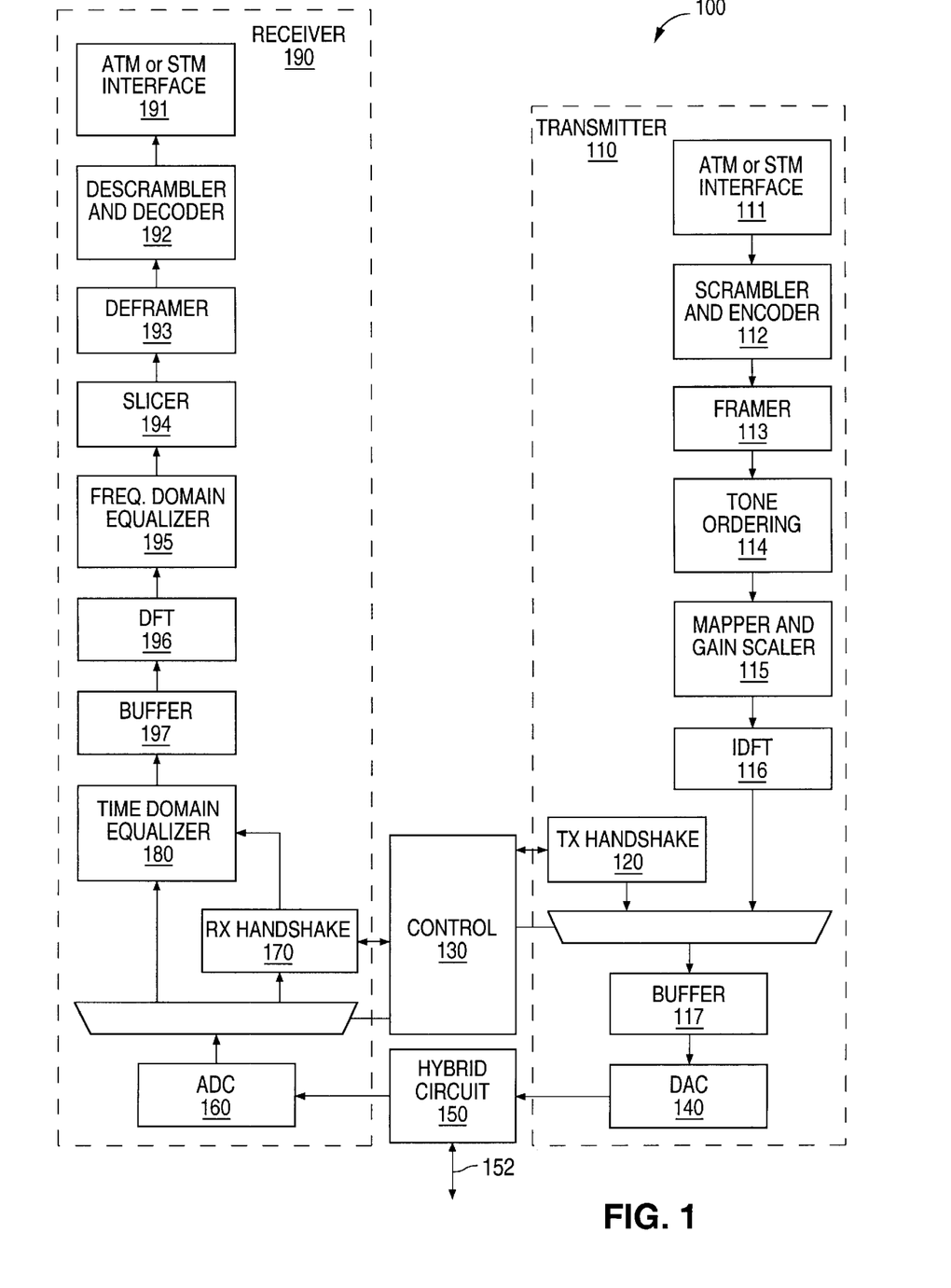
FIG. 1 is the block diagram of a xDSL transceiver in accordance with an embodiment of the invention.

FIG. 1 is the general block diagram of an xDSL transceiver 100 for a downstream user. This invention particularly relates to a time domain equalizer 180 in a receiver portion 190 of transceiver 100 or in a similar upstream transceiver. Many of the other components of transceiver 100 are conventional and are described only briefly below. One of skill in the art will recognize many ways of implementing such structures. For example, transceiver 100 can be implemented with dedicated hardware as in conventional xDSL transceivers and modems. Alternatively, transceiver 100 can be a host signal processing transceiver where a hybrid circuit 150 and converters 140 and 160 are dedicated communication hardware, and the other blocks of transceiver 100 are software that a host computer executes. Yet another alternative is a hybrid hardware/software transceiver such as described in co-owned U.S. Pat. App. Ser. No. 09/263,160, entitled "Hybrid Software/Hardware Discrete Multi-Tone Transceiver", which was filed Mar. 5, 1999 and is hereby incorporated by reference in its entirety.

On a transmitter side 110, transceiver 100 includes an asynchronous transfer mode (ATM) or synchronous transfer mode (STM) interface 111 through which transceiver 100 receives data to be transmitted to a remote transceiver (not shown). Typically, interface 111 is implemented in hardware or software of a host computer (not shown), and the data may be from an application that the host computer executes or from a terminal in a local network connected to the host computer.

A scrambler and encoder 112 performs initial encoding of the data. The encoding is in accordance with a protocol that transceiver 100 implements. For example, encoder 112 may interleave the data and append cyclic redundancy codes or error detection and correction codes to the data. A framer 113 breaks the encoded data stream from encoder 112 into bit sets. Each bit set is assigned to a sub-channel for transmission. A tone ordering block 114 orders the bit sets by sub-channel for a constellation mapper 115. Constellation mapper 115 determines a QAM symbol associated with the bit set for the quadrature amplitude modulation (QAM) of the assigned sub-channel. Constellation mapper 115 also scales the determined QAM symbols according to the power levels allocated to the sub-channels. A DMT symbol includes one QAM symbol per sub-channel. An inverse Fourier transform block 116 performs inverse Fourier transforms on DMT symbols to convert each DMT symbol into a sequence of time domain samples. A buffer 117 receives the time domain samples and sequentially provides samples to a digital-to-analog converter (DAC) 140 at the rate required for conversion to an analog communication signal. Hybrid circuit 150 transmits the analog signal from DAC 140 to telephone lines 152 coupled to hybrid circuit 150.

Transmitter 110 also includes a TX handshake block 120 which generates time domain samples for a handshake signal sent to a remote transceiver when establishing a connection or during retraining. Typically, the handshake signal includes a pattern that the remote transceiver requests, and a control block 130 interprets a received signal from the remote transceiver to determine whether the TX handshake block 120 or IDFT 116 provides the samples that pass through buffer 117 to DAC 140.

Hybrid circuit 150 directs a received analog communication signal from telephone lines 152 to receiver 190. An analog-to-digital converter (ADC) 160 samples the analog signal and passes digitized samples to a handshake block 170 during a connection sequence and to TEQ 180 once a connection is established. TEQ 180 is an adaptable digital filter that transceiver 100 trains when connecting with the remote transceiver. For the training, the remote transceiver transmits a probing signal to the transceiver 100, and an RX handshake block 170 receives digital samples from ADC 160. Block 170 determines the coefficients or taps of TEQ 180.

After connection, TEQ 180 filters incoming samples to shorten the impulse response of the channel and reduce distortion across the broadband signal. TEQ 180 stores filtered samples in a buffer 197. A discrete Fourier transform (DFT) block 196 performs a discrete Fourier transform on the filtered time-domain samples associated with a DMT symbol to determine frequency components associated with the sub-channels. A frequency domain equalizer 195 then filters the frequency components to further reduce channel distortion. A slicer 194 scales the individual components according to the scaling that the transmitter performed to adjust the relative powers in the sub-channels and then determines the QAM symbols associated with the sub-channels. A deframer converts the QAM symbols into a bit stream which a descrambler and decoder 192 converts to the final data. An ATM or STM interface 191 directs the data to the appropriate receiving device or application.

In accordance with the invention, RX handshake block 170 implements a handshake process that efficiently trains TEQ 180 for equalizing a received communication signal. As part of the initialization regiment, the remote transceiver sends a probing signal through the channel for training TEQ 180 and estimating the channel's capacity. The probing signal includes time domain samples that are a periodically repeated, pseudo-random sequence of values (sometimes referred to herein as the reverb signal). The reverb signal generally has a uniform frequency content across the spectrum of the broadband channel and is periodic without a redundant prefix. RX handshake block 170 expects reverb signal as transmitted to have a uniform frequency content and uses the received reverb signal to estimate the spectral response of the channel and initialize the taps of TEQ 180. The G.992.2 standard allows for Frequency Division Multiplexing (FDM) implementations of the transceiver in which the upstream and downstream data are sent in two mutually exclusive frequency bands. During the handshaking each transceiver has the option of transmitting a reverb signal that only covers it's transmit frequency band (or equivalently the other transceiver's receive frequency band). Another possibility is that a transmitter sends a full reverb signal, which covers the whole spectrum for the broadband communication signal, but the receiver has filters (FDM filters) that filter out any signal outside the receive band (or equivalently, outside the transmitter transmit band). In either of these two cases, the receiver only receives or processes a partial reverb signal, which lacks data for the channel's response at frequencies outside the receive band. The lack of data appears as a portion of the band width having frequency components with zero or very small amplitudes. For these cases, the receiver can generate replacement data for the data missing from the reverb signal. For example, if a low frequency portion of the reverb signal is missing, the receiver uses replacement data indicating the channel carries the low frequencies without distortion or attenuation. Missing high frequency portions of the reverb signal can be replaced with zeros indicating that the channel completely attenuates the high frequency components, which is an acceptable approximation for training TEQ 180. With the replacement data, the response estimate H(f) of the channel can be determined.

One known method for estimating the taps of an equalizer from the response estimate H(f) is auto regressive moving average (ARMA) spectral estimation. ARMA estimation attempts to find an IIR filter that best fits the channel characteristics. A predetermined "fitting criterion" determines the quality of the fit. In particular, one assumes the z-domain channel equation has zeros (numerator equations) and poles (denominator equations), and attempts to estimate these poles and zeros. The ARMA estimation method can use Modified Yule-Walker equations which contain auto correlation (AC) estimates of the received signal. Solving the Modified Yule-Walker equations provides coefficients of the numerator and denominator polynomials of the IIR filter that fits the channel. S. L. Marple, "Digital Spectral Analysis with Applications", Prentice-Hall, 1987 describes the known spectral analysis techniques including use of Modified Yule-Walker equations and is hereby incorporated by reference in its entirety. The number of Modified Yule-Walker equations is generally greater than the number of unknowns (IIR filter coefficients), hence, the "fitting criterion" such as the least squares fit is usually required to find the best fit solution.

Figure 2:
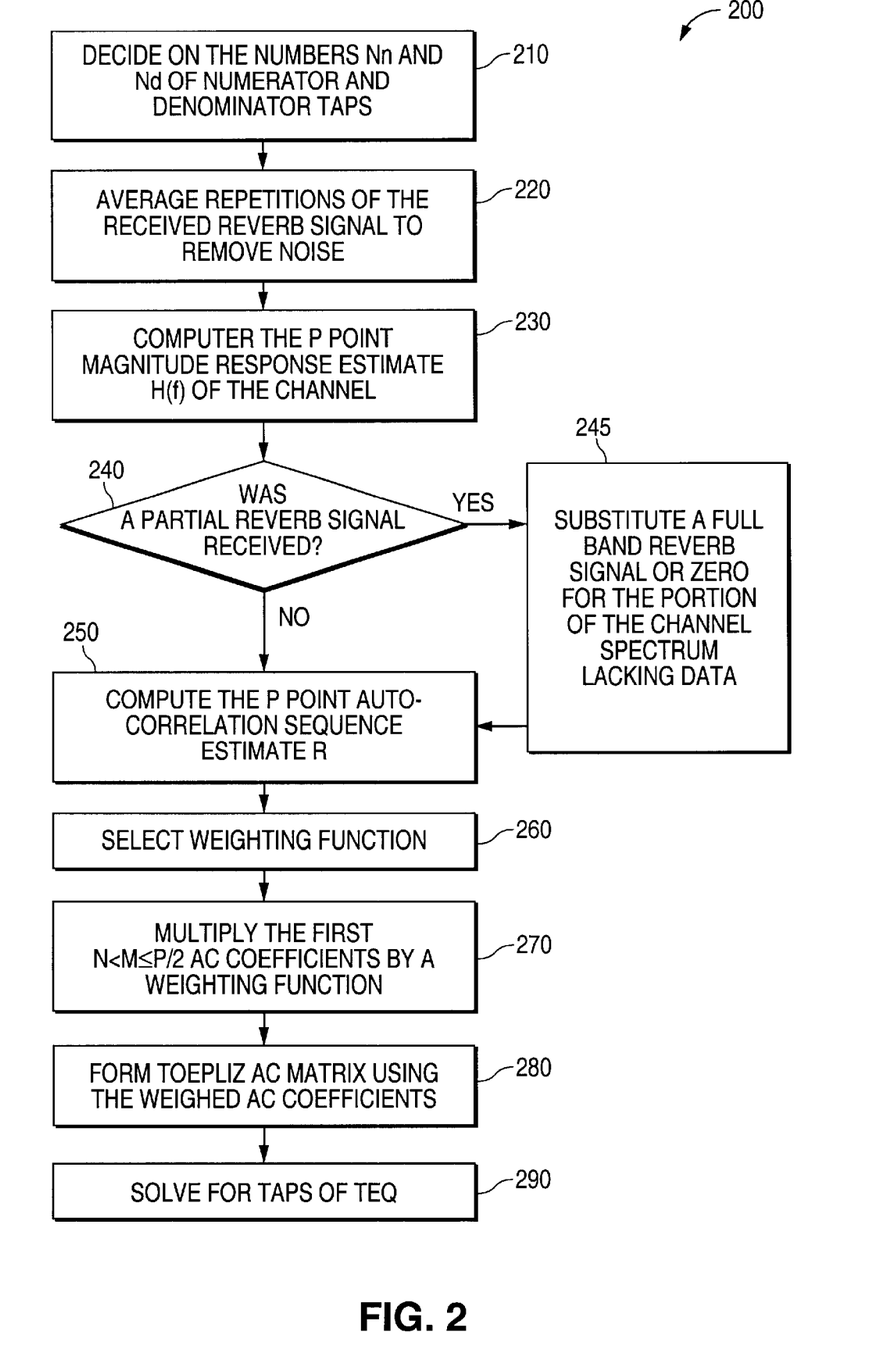
FIG. 2 is a flow diagram of a process in accordance with the invention for creating and initializing a time domain equalizer in the xDSL transceiver of FIG. 1.

FIG. 2 illustrates a method in accordance with the invention for creating or training a TEQ 180 which includes a digital filter. An initial step 210 selects the number Nn of numerator taps and the number Nd of denominator taps for the IIR filter. In an exemplary embodiment of the invention, which is described further below, the number of numerator taps in the IIR filter is the same as the number of denominator taps (Nn=Nd=N). The number of taps required in at particular time domain equalizer depends on the sampling frequency of the receiver, the spectrum of communication signals, and the nature of the channel. About 10 taps are sufficient for a xDSL transceiver having a sampling rate of 1.5 MHz for a G.992.2-complaint communication signal transmitted over telephone lines of the average length between a central office and a user.

The remote transceiver repeatedly sends the reverb signal, which is a white signal having uniform frequency content across the spectrum of the broadband communication signal, or a partial reverb signal, which covers the receive band of the local transceiver. The reverb signal has a series of time-domain samples x(1) to x(p), and the remote transceiver repeatedly converts the series of time domain samples to a transmitted analog signal. Transceiver 100 receives the analog signal which ADC 160 converts to digital samples for RX handshake block 170. In the exemplary embodiment, the series of samples x(1) to x(p) includes 256 samples which the remote transceiver sends 1000 or more times. In step 220, RX handshake block 170 averages the digital samples to determine average received samples y(1) to y(p) which respectively correspond to the transmitted samples x(1) to x(p). Averaging removes the effects of additive or random noise so that the differences between the averaged received samples y(1) to y(p) and the transmitted samples indicate the channel's response.

Step 230 determines the p-point magnitude response estimate of the channel H(f) indicated in Equation 1.

$$|H(f)| = \frac{|FT(y(n))|}{|FT(x(n))|} \qquad \text{Equation 1:}$$

In Equation 1, FT( ) is the p-point Fourier transform of its argument, and f is a frequency index having values 1 to p. Magnitude response H(f) indicates how much the channel attenuates each frequency component of the transmitted signal. Magnitude response H(f) is constant for a distortion free channel.

Step 240 determines whether the receiver analyzed only a partial reverb because the remote transmitter only sent a partial reverb signal or because the receiver filtered out the frequencies outside the received band. If only a partial reverb signal was analyzed, step 245 sets the low frequency portion the channel response H(f) to 1. A missing high frequency portion of channel response H(f) can remain zero. Process 250 branches to step 260 after step 240 determines a full reverb signal was analyzed or after step 245 replaces a missing portion of estimated channel response H(f).

From magnitude response H(f), step 250 determines the auto-correlation sequence R(1) to R(p) for each frequency 1 to p using Equation 2.

$$R=IFT(|H(f)^2|) \qquad \text{Equation 2:}$$

In Equation 2, IFT( ) is the inverse Fourier transform from the frequency domain back to the time domain.

The Modified Yule-Walker equations use the auto-correlation sequence from the received reverb signal. In accordance with an aspect of the invention, process 200 modifies the Modified Yule-Walker equations and ARMA estimation by applying a weighting function to a set of M coefficients from the auto-correlation sequence R(1) to R(p) before solving the Modified Yule-Walker equations. The number M is greater than the number of poles in the z-domain representation of the IIR filter and less than or equal to half the number P of sequence points (e.g., P/2≧M>N). Step 260 selects a weighting function which has values for frequencies 1 to P, or at least for frequencies 1 to M. Step 270 multiplies the M respective values of the weighting function by corresponding auto-correlation coefficients. In the exemplary embodiment, the weighting function is a sigmoidal function, and step 270 multiplies the first M auto-correlation coefficients R(1) to R(M) by the weighting function as indicated in Equation 3 to generate weighted coefficients R'(1) to R'(M).

$$R'(i) = \frac{R(i)}{\left(1 + \alpha_e^{\beta(i-M/2+1)}\right)} \text{ for } i = 1:M \qquad \text{Equation 3:}$$

Figure 3A:
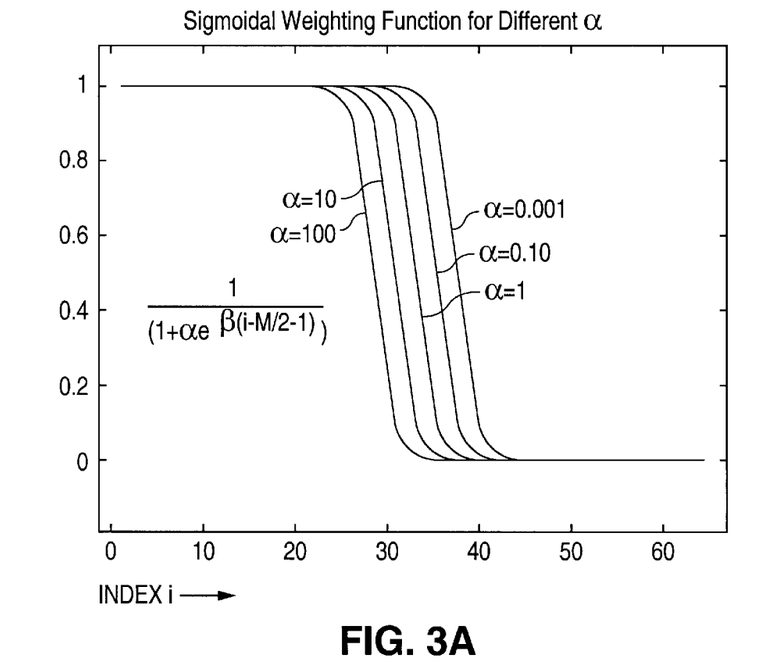
FIGS. 3A and 3B illustrate sigmoidal functions with different parameters.
Figure 3B:
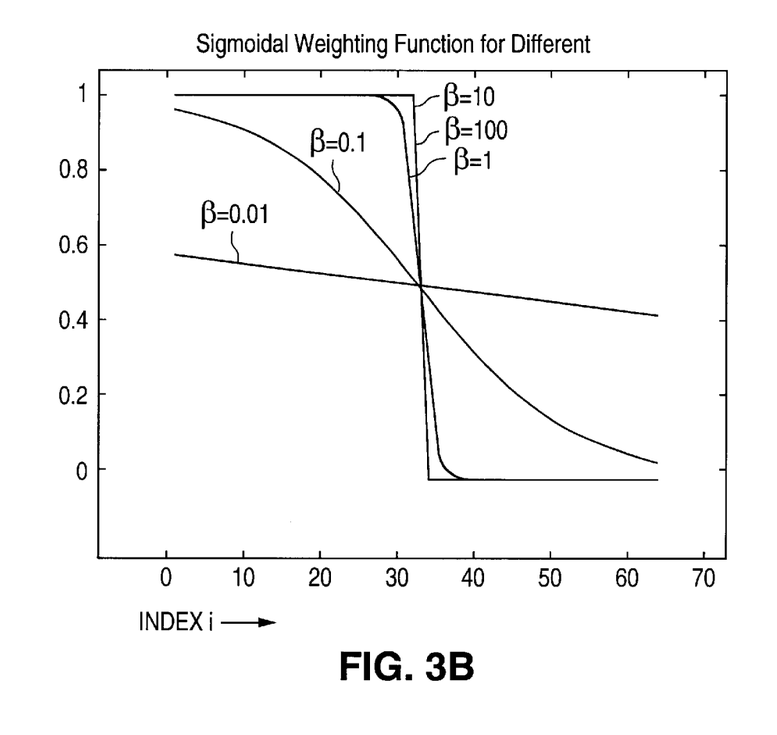

Parameters $\alpha$ and $\beta$ of the sigmoidal function can be selected according to the communication system and protocol. (Typically, $\alpha=\beta=1$.) FIGS. 3A and 3B shows plots of the sigmoidal function for different values of parameters $\alpha$ and $\beta$ when M is 60. Although a sigmoidal weighting function provides good results when training an equalizer, other weighting functions can be used to similar effect. With the sigmoidal function, the weighted auto-correlation coefficients R'(i) are significantly smaller than auto-correlation coefficients R(i) when the index i greater than about M/2.

Step 280 forms an (M-N-1)-by-(N-1) Toeplitz auto-correlation matrix T from the weighted coefficients as shown in Equation 4.

$$T = \begin{pmatrix} R'(2) & \cdots & \cdots & R'(N) \\ R'(3) & \ddots & & \vdots \\ \vdots & & \ddots & \vdots \\ R'(M-N) & \cdots & \cdots & R'(M-1) \end{pmatrix} \qquad \text{Equation 4:}$$

The Toeplitz matrix T provides an overdetermined system of Equations 5 which relates the weighted AC coefficients R' to the denominator taps a(2) to a(N) of an IIR filter representing the channel. (Tap a(1) is 1.)

$$T^*A = V \qquad \text{Equation 5:}$$

In Equation 5, A and V are vectors defined in Equations 6 and 7 respectively.

$$A = \begin{pmatrix} a(N) \\ \vdots \\ a(2) \end{pmatrix} \qquad \text{Equation 6:}$$

$$V = \begin{pmatrix} -R'(N+1) \\ \vdots \\ -R'(M) \end{pmatrix} \qquad \text{Equation 7:}$$

Step 290 solves for the denominator taps A of the IIR filter. Since the system of equations of Equation 5 is over determined, solving the system determines denominator taps [1, a(2), . . . , a(N)] that provide the least error according to the fitting criterion. In the exemplary embodiment, the solution provides the least squared error. It is believed that using a weighting function such as the sigmoidal function diminishes the effect of AC coefficients that cause the most error in the solving of the overdetermined system. In particular, the impact of auto-correlation coefficients at higher correlation delays is lessened.

Equation 8 gives the response hteq of TEQ 180 in terms of denominator taps a(2) to a(N) of the ARMA estimation of the channel as determined above.

$$hteq(z) = 1 + a(2)z^{-1} + \ldots + a(n)z^{-n+1} \qquad \text{Equation 8:}$$

At this point, there is no need for the numerator taps b of the ARMA estimation of the channel because TEQ 180 is an FIR filter and hence only has a numerator A. However, the ARMA estimation has a numerator estimation B and a denominator estimation A and is modeled as an IIR filter (B/A). The denominator estimate A of the channel is used for TEQ 180. Hence, the cascade of the channel with TEQ 180 is (B/A)*A leaves a residual B. If numerator estimate B has fewer roots than the number of cyclic prefix samples used in DMT symbol or in other words, the impulse response of numerator estimate B is shorter than 16 samples for G.992.2, then TEQ 180 has effectively eliminated the ISI even without correcting for the numerator B of the ARM estimation. However, the impulse response of the numerator estimate B may be greater than the length of the cyclic prefix in a DMT symbol. To compute the estimate's error, the numerator taps b(1) to b(N) are determined using Equation 9.

$$[b(1), \ldots, b(N)] = window_N\{IFT[H(f)^*FT(a(n))]\} \qquad \text{Equation 9:}$$

In Equation 9, FT( ) and IFT( ) are the Fourier and inverse Fourier transforms, a(n) are the denominator taps of the ARMA estimation of the channel, and $window_N$ function masks the N consecutive samples (taps) with the highest total power. Equation 10 gives the error.

$$error = IFT[H(f) - (FT(B)/FT(A))] \qquad \text{Equation 10:}$$

In Equation 10, the channel magnitude response H(f) is measured or determined for the channel as given above.

Figure 4:
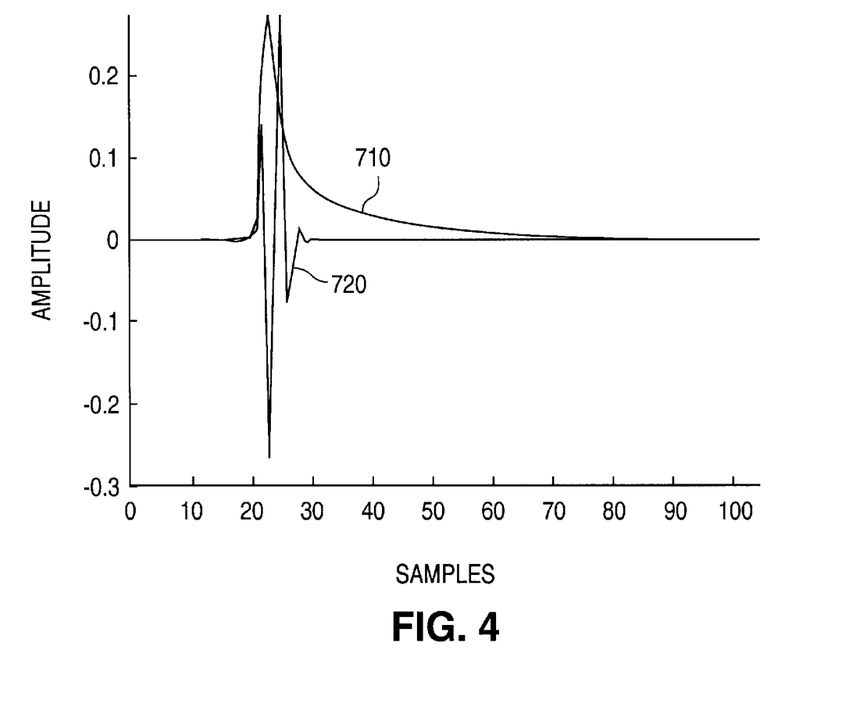
FIG. 4 shows plots of the impulse response of a channel with and without a time domain equalizer in accordance with the invention.

FIG. 4 shows a plot 710 of a typical impulse response for a DMT channel on 12000 kfeet of 26 gauge copper loop. Plot 720 shows the impulse response after equalization. As shown in FIG. 4, TEQ 710 shortens the impulse response significantly, e.g., to fewer samples than 10 samples. Thus, the redundant prefix of a typical DMT protocol such as G.992.2 or G.992.1 can contain the ISI.

Figure 5:
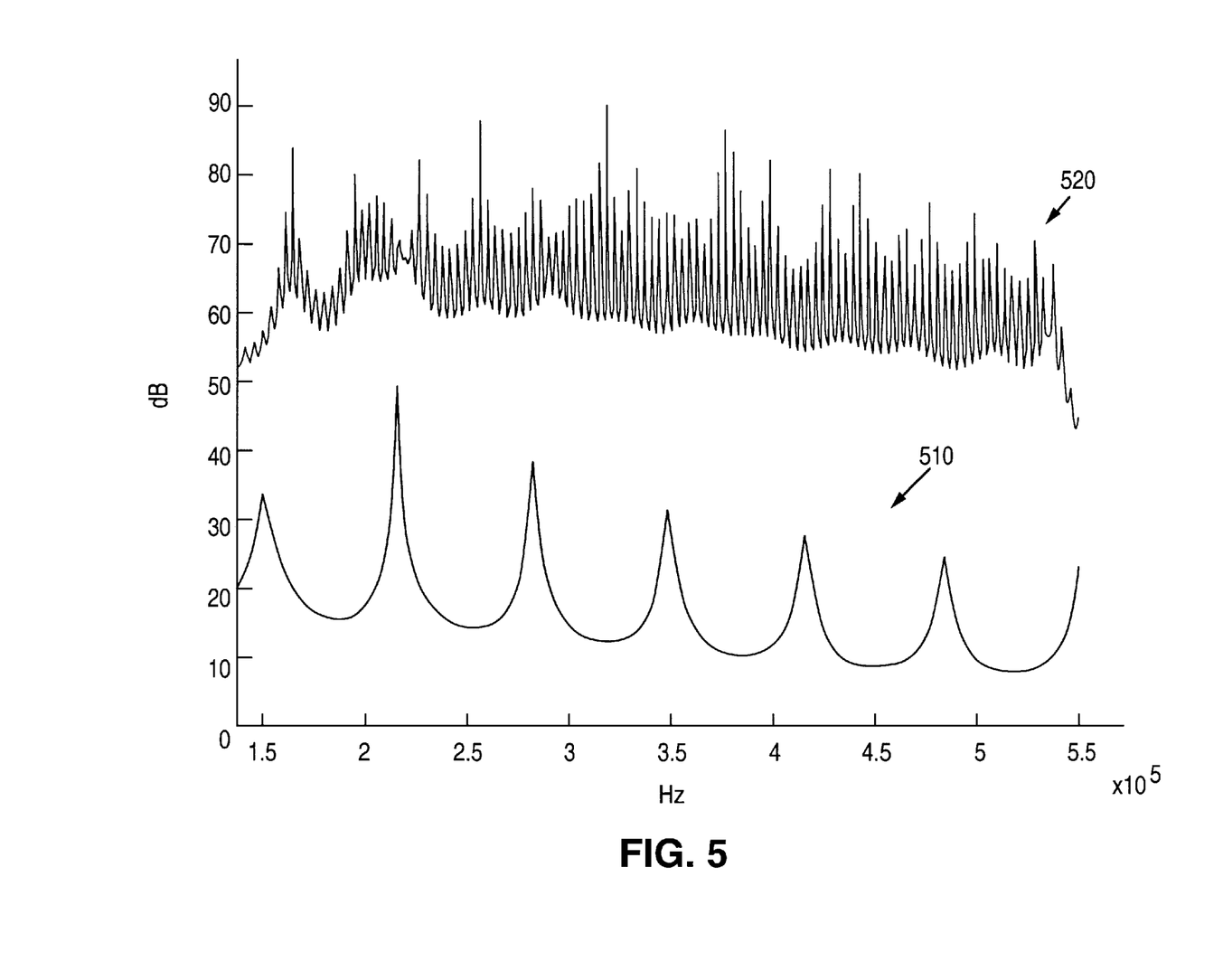
FIG. 5 shows plots of the signal-to-ISI ratio for a channel with and without a time domain equalizer in accordance with the invention.
Figure 6:
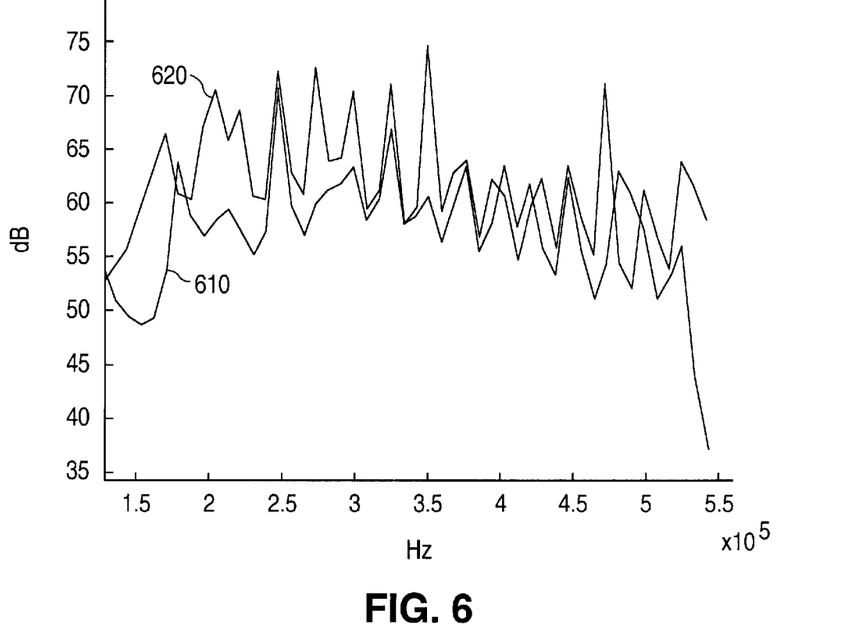
FIG. 6 shows plots of the signal-to-ISI ratio for a channel with a time domain equalizer trained using a known training method and a training method in accordance with an embodiment of the invention.

FIG. 5 shows plots 510 and 520 respectively of SIR (Signal to ISI Ratio) before and after equalization with a time domain equalization in accordance with the invention. As illustrated, TEQ 180 provides significant and needed reduction in the ISI. FIG. 6 shows plots 620 and 610 respectively of SIR when TEQ training uses the sigmoidal weighting function (as outlined in step VI above) and when weighting is not used. (Rapid variations with frequency associated with the SIR such as shown in FIG. 5 are removed to improve clarity in FIG. 6.) The overall SIR figures indicate that using the sigmoidal weighting with the correct choice of parameters $\alpha$ and $\beta$ provides a 3 dB improvement when compared to no weighting. The improvement is particular significant at very low and very high frequencies.

Although the invention has been described with reference to particular embodiments, the description is only an example of the invention's application and should not be taken as a limitation. In particular, much of preceding discussion was aimed at initializing a time-domain equalizer in a receiver system (communication device) to equalize the channel and shorten the channel impulse response. The processes disclosed can also be used in design of IIR and other digital filters given a desired frequency response or in spectral estimation problems using ARMA models. Various other adaptations and combinations of features of the embodiments disclosed are within the scope of the invention as defined by the following claims.

I claim:

1. A communication method comprising:

measuring a frequency response of a channel;

determining an auto-correlation sequence from the frequency response;

applying a weighting function to coefficients from the auto-correlation sequence to thereby determine weighted coefficients; and using the weighted coefficients in an overdetermined system of equations to identify taps of a digital filter that reduces an impulse response of the channel.

2. The method of claim 1, wherein the weighted coefficients corresponding to higher index values in the auto-correlation sequence have magnitudes that are relatively lower than magnitudes of the corresponding unweighted auto-correlation coefficients.

3. The method of claim 2, wherein the weighting function is a sigmoidal function.

4. The method of claim 1, further comprising using the digital filter in a time-domain equalizer for an xDSL transceiver.

5. The method of claim 1 wherein using the weighted coefficients in the overdetermined system of equations, comprises solving the overdetermined system of equations using a fitting criterion to the identify taps of the digital filter.

6. The method of claim 5, wherein the fitting criterion identifies taps that cause least square error the overdetermined systems of equations.

7. The method of claim 1, wherein measuring the frequency response comprises:
receiving a received signal that corresponds to repeated copies of a transmitted signal that was transmitted over a channel;
averaging samples of the received signal that correspond to repetitions of a selected value in the transmitted signal, the averaging providing averaged sample values;
repeating the averaging step for a plurality of values in the transmitted signal;
performing a Fourier transform on the averaged sample values; and
comparing Fourier components from the transform to a known frequency content of the transmitted signal.

8. The method of claim 7, wherein the transmitted signal includes a pseudo-random sequence of values that are repeated.

9. The method of claim 1 wherein using the weighted coefficients in the overdetermined system of equations, comprises solving the overdetermined system of equations to identify denominator taps of an IIR filter that approximates the response of the channel, wherein the digital filter is a FIR filter that has taps equal to the identified denominator taps.

10. The method of claim 9, wherein solving the overdetermined system of equations uses a fitting criterion to the identify taps of the IIR filter.

11. The method of claim 1, wherein measuring the frequency response comprises:
receiving a reverb signal from the channel, wherein the reverb signal as transmitted had a known frequency distribution over at least a portion of a band width of the channel;
selecting replacement data for a first potion of the band width, wherein the reverb signal as transmitted did not include frequency components in the first portion of the band width; and
determining the frequency response using the replacement data and data from the reverb signal as received.

12. The method of claim 11, wherein selecting the replacement data comprises:
selecting replacement data that indicates no attenuation or distortion in the channel if the first portion is a low frequency band; and
selecting replacement data that indicates complete attenuation in the channel if the first portion is a high frequency band.

13. The method of claim 11, where the reverb signal as transmitted has a uniform frequency distribution over a second portion of the band width, the second portion corresponding to transmission frequencies for a remote transmitter.

14. A communication system comprising:
a time domain equalizer including a digital filter that reduces an impulse response of a channel;
a converter that samples a received signal via the channel during training of the time domain equalizer; and
a handshake block that trains the time domain equalizer, using a training process comprising:
measuring a frequency response of the channel;
determining an auto-correlation sequence from the frequency response;
applying a weighting function to coefficients from the auto-correlation sequence to thereby determine weighted coefficients; and
using the weighted coefficients in an overdetermined system of equations to identify taps of the digital filter.

15. The system of claim 14, wherein the weighted coefficients corresponding to higher index values in the auto-correlation sequence have magnitudes that are relatively lower than magnitudes of the corresponding unweighted auto-correlation coefficients.

16. The system of claim 15, wherein the weighting function is a sigmoidal function.

17. The system of claim 14, wherein the time-domain equalizer is for an xDSL transceiver.

18. The system of claim 14, wherein the handshake block solves the overdetermined system of equations using a fitting criterion.

19. The system of claim 18, wherein the fitting criterion identifies taps that cause least square error the overdetermined systems of equations.

* * * * *